Oct. 30, 1951  A. W. TRONNIER  2,573,512
FOUR-LENS TRIPLET TYPE PHOTOGRAPHIC OBJECTIVE
Filed Nov. 17, 1949
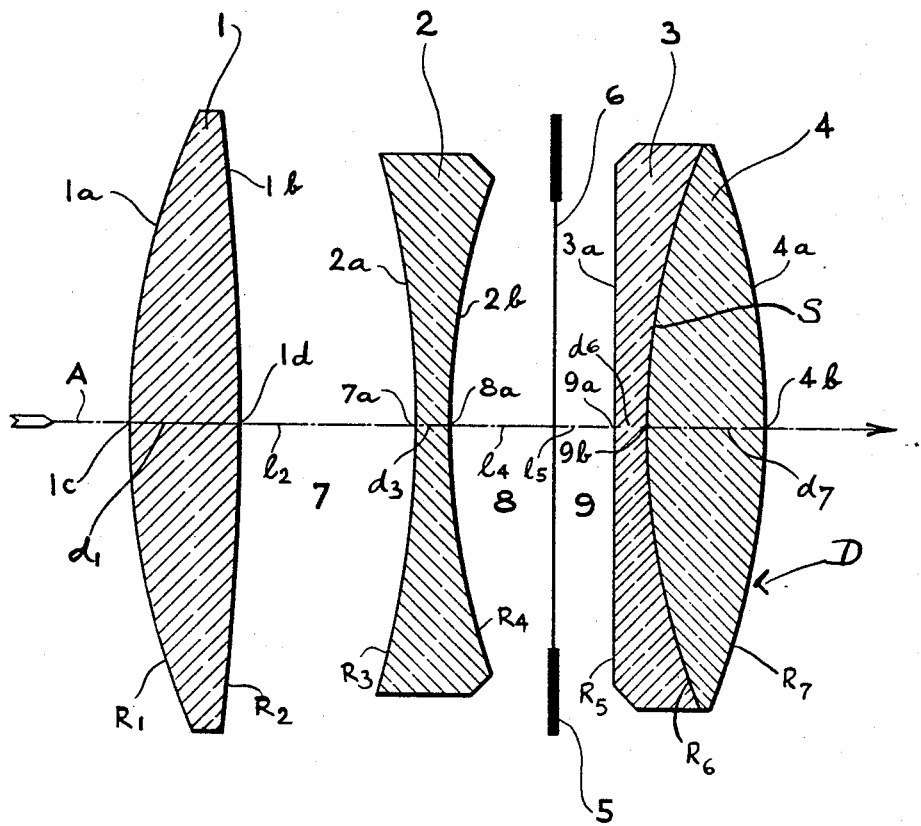
*INVENTOR.*
ALBRECHT WILHELM TRONNIER
BY
Mock & Blum
ATTORNEYS.

Patented Oct. 30, 1951

2,573,512

UNITED STATES PATENT OFFICE 2,573,512

FOUR-LENS TRIPLET TYPE PHOTOGRAPHIC OBJECTIVE

Albrecht Wilhelm Tronnier, Gottingen, Germany, assignor to Voigtlander & Sohn Aktiengesellschaft, Braunschweig, Germany, a corporation of Germany Application November 17, 1949, Serial No. 127,928
In Switzerland April 30, 1949

1 Claim. (Cl. 88—57)

This invention relates to a new and improved anastigmatic four-lens photographic objective, which produces an anastigmatic flattening of the field.

The improved objective is of the triplet type, which has three members, which are separated by intermediate air spaces.

The front half of the improved objective, which is located forwardly of the diaphragm, and which faces the object space and the longer conjugate focal length of the objective, consists of two lenses of opposite power. One said lens is collecting or positive. The other lens is negative or dispersing. The air space between said lenses acts as a negative or dispersing lens.

The rear half of the objective, which is located rearwardly of the diaphragm, consists of two lenses which are cemented to each other to form a cemented doublet. These doublet lenses are also of opposite power, one being positive and the other being negative. The identical adjacent surfaces of the lenses of said cemented doublet, which are cemented to each other to form a single common lens surface, are strongly positive, namely, convex relative to the diaphragm.

This cemented doublet has greater positive power than the entire objective.

The improved objective provides a considerably higher correction for oblique aberrations, which are exemplified by astigmatism and coma, than the original and well-known Taylor triplet objective.

One of the factors which results in this high correction, is the large curvature of the abutting cemented surfaces of the lenses of the cemented doublet, which are convex relative to the diaphragm. Another factor is the favorable effect of the low index of refraction of negative lens of the cemented doublet in the Petzval series and thereby on the curvature of the field. The selection of this refractive index is confined to a very narrow range, due to the limited selection of optical glasses. Ordinarily and in former types of triplet photographic objectives, the desired effects could be secured only by increasing the high curvature of the abutting cemented surfaces, which operate as a single lens surface. This old design caused considerable technical and manufacturing disadvantages which made such increase of curvature impractical.

According to the present invention, the limitations and disadvantages of former triplet photographic objectives are largely eliminated by means which are later described and analyzed herein.

Numerous other objects and advantages and features of the invention are disclosed in the annexed description and drawing, which illustrate a preferred embodiment of the invention.

The drawing is a vertical section on the optical axis of the objective, said optical axis being shown in the horizontal position.

The objective has an optical axis A, which is horizontal in the drawing.

The front half of the objective consists of a positive or collecting lens 1 and a negative or dispersing lens 2, which are separated by an intermediate air space or meniscus 7, which has a negative or dispersing effect. The object space and the longer conjugate focal length of the objective are at the left of lens 1.

The negative lens 2 is separated from the diaphragm 5 by an intermediate air space 8. Said diaphragm 5 has the usual adjustable aperture 6.

The diaphragm 5 is separated from the rear half of the objective by an intermediate air space 9.

The rear half of the objective is a cemented doublet D, which consists of a front negative lens 3 and a rear positive lens 4. These doublet lenses 3 and 4 have identical adjacent cemented surfaces S.

In the following disclosure, certain symbols are used, which are identified as follows:

$nC$ is the index of refraction of a lens for red light at the Fraunhofer C line, whose wave length is 6563 angstrom units.

$nd$ is the index of refraction of a lens for yellow light, at a wave length of 5876 angstrom units.

$nF$ is the index of refraction of a lens for blue light at the Fraunhofer F line, whose wave length is 4862 angstrom units.

The Abbé number "$v$" equals, $$\frac{nd-1}{nF-nC}$$

$R_1$ is the radius of curvature of the front surface $1a$ of lens 1.

$R_2$ is the radius of curvature of the rear surface $1b$ of lens 1.

$d_1$ is the axial thickness of lens 1, between the axial points $1c$ and $1d$ of the optical axis A.

$l_2$ is the axial thickness of air space 7, between the axial points $1d$ and $7a$ of optical axis A. This axial space 7 is a negative air space or meniscus.

$R_3$ is the radius of curvature of the front surface $2a$ of lens 2.

$R_4$ is the radius of curvature of rear surface $2b$ of lens 2.

$d_3$ is the axial thickness of lens 2, between the axial points $7a$ and $8a$.

$l_4$ is the axial thickness of the air space 8, between the axial point $8a$ and the axial point of the aperture 6 of diaphragm 5.

$l_5$ is the axial thickness of air space 9, between said axial point of aperture 6 and axial point $9a$.

$R_5$ is the radius of curvature of front surface $3a$ of lens 3.

$R_6$ is the radius of curvature of the common surface S of lenses 3 and 4.

$d_6$ is the axial thickness of lens 3, between the axial points 9a and 9b.

$R_7$ is the radius of curvature of the rear surface 4a of lens 4.

$d_7$ is the axial thickness of lens 4, between the axial points 9b and 4b.

All measurements of length are in millimeters.

The figure illustrates an objective which has an equivalent focal length of 200 millimeters.

Since the design is the same as for an objective which has a unit focal length of 100 millimeters, the specific figures later stated herein, are for an objective which has a unit equivalent focal length of 100 millimeters.

In the specific example, the relative aperture of the objective is defined as f/3.5, in which the "f/" number is, $$\frac{\text{focal length}}{\text{diameter of entrance pupil}}$$

Hence, for an equivalent focal length of 100 millimeters, f/3.5 identifies an entrance pupil whose diameter is 28.571 millimeters.

Following usual practice, the radius of curvature of each surface which is convex relative to the object space is given a plus sign and such surfaces are designated as positive, and the radius of curvature of each curved surface which is concave relative to the object space is given a negative sign, and such surfaces are designated as negative.

The symbol P designates the back focal length of the objective, which is measured rearwardly along the optical axis A from the point of intersection 4b of said optical axis A and the rear surface 4a of lens 4. In this example, which is calculated for an equivalent focal length of 100 millimeters, P equals 85.093 millimeters, rearwardly of axial point 4b.

The values of this specific example are as follows:

LENS 1

| $R_1$ | $R_2$ | $d_1$ | nd | v |
|---|---|---|---|---|
| +36.973 | −2142.24 | 5.644 | 1.63800 | 55.6 |

Air space 7
$l_2$ equals 8.415

LENS 2

| $R_3$ | $R_4$ | $d_3$ | nd | v |
|---|---|---|---|---|
| −53.361 | +36.973 | 1.591 | 1.64819 | 33.7 |

Air space 8
$l_4$ equals 5.131
Air space 9
$l_5$ equals 2.822

LENS 3

| $R_5$ | $R_6$ | $d_5$ | nd | v |
|---|---|---|---|---|
| +2142.24 | +39.970 | 1.642 | 1.58241 | 40.6 |

LENS 4

| $R_6$ | $R_7$ | $d_7$ | nd | v |
|---|---|---|---|---|
| +39.970 | −39.970 | 5.387 | 1.65908 | 50.9 |

One of the advantages of the improved objective is that lens 4 has front and rear surfaces of identical curvature.

In order further to identify said lenses, their respective indices of refraction nF and nC are stated as follows:

| Lens | Mean dispersion |
|---|---|
| 1 | 0.01148 |
| 2 | 0.01923 |
| 3 | 0.01433 |
| 4 | 0.01296 |

The above example illustrates certain general principles or factors of the invention, which are within its scope. Some of these general principles are stated below, and the invention includes other embodiments which include one or more of said general principles or factors, and the invention also includes said principles or factors in combination and in various sub-combinations. The best results are secured by combining all of these factors, but the invention is not limited to such entire combination.

Some of these principles or factors are stated below:

*Arithmetical mean of indices of refraction nd of the four lenses*

In this example, the respective indices of refraction nd of the lenses 1, 2, 3, 4 are respectively 1.63800, 1.64819, 1.58241, and 1.65809, with an arithmetical mean of 1.63192.

This arithmetical mean exceeds 1.62500.

The minimum value of this arithmetical mean is preferably substantially 1.62550.

*Difference between indices of refraction nd of lenses 3 and 4 of cemented doublet D*

As above noted, said indices of refraction nd of lenses 3 and 4 are respectively 1.58241 and 1.65908, with a difference of 0.07667.

This difference exceeds 0.055.

The minimum value of said difference is preferably substantially 0.0555.

*Difference between the arithmetical mean of the indices of refraction nd of lenses 1 and 2, and the arithmetical mean of the indices of refraction nd of lenses 3 and 4*

As above noted, the respective indices of refraction nd of lenses 1 and 2 of the front half of the objective are 1.63800 and 1.64819, with an arithmetical mean of 1.643095.

The respective indices of refraction nd of the lenses 3 and 4 of the rear half of the objective are 1.58241 and 1.65908, with an arithmetical mean of 1.620745.

The difference between these two arithmetical means is 0.022350, which exceeds 0.020000.

The minimum value of said difference between these two arithmetical means is preferably substantially 0.02050.

*Relation between sum of the positive radii of curvature $R_1$, $R_4$, $R_6$, and the equivalent focal length of the objective*

The radii of curvature $R_1$, $R_4$, $R_6$ are the radii of curvature of surfaces which are convex or positive relative to the object space.

In this example, the respective lengths of said radii $R_1$, $R_4$, $R_6$, are plus 36.973, plus 36.973 and plus 39.970.

The sum of said three lengths is 113.916 millimeters.

The equivalent focal length of the entire objective, in this example, is 100 millimeters.

Hence the sum of the three positive radii of curvature exceeds the equivalent focal length.

The minimum value of said sum is preferably substantially 101 per cent of said equivalent focal length.

*Relation between the sum of the positive radii of curvature $R_1$ and $R_4$ of the front half of the objective and two-thirds of the equivalent focal length of the objective*

The respective lengths of the positive radii $R_1$ and $R_4$ of the front half of the objective are respectively plus 36.973 and plus 36.973 millimeters, whose sum is 73.946 millimeters.

In this example, two-thirds of the equivalent focal length is 66.66 millimeters.

Hence said sum is greater than two-thirds of said equivalent focal length.

The minimum value of said sum is preferably susbtantially 101 per cent of two-thirds of the equivalent focal length.

*Relation between positive radius of curvature $R_6$ of common cemented surface S, to sum of positive radii $R_1$ and $R_4$ of front half of objective*

In this example, and as above noted, the positive radii $R_1$ and $R_4$ have respective equal lengths of plus 36.973 millimeters, whose sum is 73.946 millimeters. One-half of said sum is 36.973 millimeters. The length of $R_6$ in this example is 39.970 millimeters, which substantially exceeds one-half said sum.

The minimum length of $R_6$ is preferably substantially 101 per cent of one-half said sum.

*Relation between negative radius of curvature $R_3$ and sum of positive radii $R_1$ and $R_4$ of front half of objective*

In this example, the negative radius $R_3$ of surface $2a$ of lens 2 has an absolute value of 53.361 millimeters, which is substantially longer than 50% of said sum and even longer than 55% of the sum of the positive radii $R_1$ and $R_4$. In this example, said sum is 73.946 millimeters and 55% thereof is 40.6703 millimeters.

Hence the absolute value of $R_3$ exceeds 55% of said sum and the length of $R_3$ does not exceed 95% of said sum.

The minimum value of $R_3$ is preferably 55.1 per cent of said sum. The maximum value of $R_3$ is 95% of said sum.

*Relation between power of the positive surfaces $1a$, $2b$ and S, to the total power of the entire objective*

As above used, the designation "power" refers to dioptric power, which is equal to the reciprocal of the focal length in meters.

In the improved objective, the total power or power sum of all its positive surfaces is substantially 500% of the total power of the entire objective. In prior objectives of the triple-cemented doublet type, this power sum is between 545% to 585% of the total equivalent power of the entire objective.

The improvement is immediately ascertainable from the Petzval condition.

Said total power of the positive surfaces is preferably at least 500% of the total power of the entire objective.

*Relation between the power of common surface S and the power of the entire objective*

The positive power of surface S is less than power of the entire objective.

*Relation between power of the cemented doublet and the power of the entire objective*

The rear cemented doublet D has a greater power than the entire objective.

I claim:

A photographic objective which has an optical axis and which consists of a front half and a rear half; said front half consisting of a front positive lens and a rear negative lens; said front positive lens having a front surface which has a positive radius of curvature; said rear negative lens having a front surface which has a negative radius of curvature and a rear surface which has a positive radius of curvature; said rear half being a cemented doublet which consists of a front negative lens and a rear positive lens, said lenses of said doublet having a common surface which has a positive radius of curvature; said lenses of said front half being axially separated by an air space; said negative lens of said front half being axially separated by an air space from said cemented doublet; said objective also having the following properties: (a) the arithmetical mean of the respective indices of refraction of said four lenses, for light having a wavelength of 5876 angstrom units, exceeds 1.625; (b) the difference between said indices of refraction of the lenses of said doublet exceeds 0.055, and said index of refraction of the negative lens of said doublet is less than said index of refraction of the positive lens of said doublet; (c) the difference between the arithmetical mean of said indices of refraction of the lenses of the front half, and the arithmetical mean of said indices of refraction of the lenses of said doublet, exceeds 0.020000; (d) the sum of all said positive radii of curvature exceeds the equivalent focal length of said objective; (e) the sum of said positive radii of curvature of said front half exceeds two-thirds of said equivalent focal length; (f) one-half the sum of said positive radii of curvature of said front half is less than the radius of curvature of said common surface; (g) the absolute value of the radius of curvature of the front surface of the negative lens located in the front half of the objective exceeds one-half the sum of said positive radii of curvature of said front half and the maximum value of said absolute value is ninety-five per cent of the sum of said positive radii of curvature of said front half; (h) the total power of the positive surfaces of said objective is substantially 500% of the total power of said objective; (i) the power of the positive cemented surface of said doublet is less than the power of the entire objective; (j) the doublet has greater power than the entire objective.

ALBRECHT WILHELM TRONNIER.

REFERENCES CITED

The following references are of record in the file of this patent:

UNITED STATES PATENTS

| Number | Name | Date |
|---|---|---|
| 1,558,073 | Bielicke | Oct. 20, 1925 |
| 1,741,947 | Merte | Dec. 31, 1929 |
| 1,849,681 | Merte et al. | Mar. 15, 1932 |
| 1,924,527 | Tronnier | Aug. 29, 1933 |
| 2,084,714 | Tronnier | June 22, 1937 |

FOREIGN PATENTS

| Number | Country | Date |
|---|---|---|
| 146,211 | Great Britain | Dec. 30, 1920 |